US009031176B2

(12) United States Patent
Vesala et al.

(10) Patent No.: US 9,031,176 B2
(45) Date of Patent: May 12, 2015

(54) SIGNAL SELECTION

(71) Applicant: Broadcom Corporation, Irvine, CA (US)

(72) Inventors: Hannu Mikael Vesala, Kempele (FI); Janne Ari Olavi Aula, Haukipudas (FI)

(73) Assignee: Broadcom Corporation, Irvine, CA (US)

( * ) Notice: Subject to any disclaimer, the term of this patent is extended or adjusted under 35 U.S.C. 154(b) by 1 day.

(21) Appl. No.: 14/084,673

(22) Filed: Nov. 20, 2013

(65) Prior Publication Data

US 2014/0140447 A1    May 22, 2014

(30) Foreign Application Priority Data

Nov. 21, 2012   (GB) .................................. 1220956.5

(51) Int. Cl.
*H04B 1/10* (2006.01)
*H04B 1/16* (2006.01)
*H04L 1/00* (2006.01)
*H04L 1/18* (2006.01)

(52) U.S. Cl.
CPC *H04B 1/16* (2013.01); *H04L 1/005* (2013.01); *H04L 1/0026* (2013.01); *H04L 1/1829* (2013.01)

(58) Field of Classification Search
USPC ................... 375/340, 346, 316, 240.27, 348; 348/731, 726, 725; 455/161.3
See application file for complete search history.

(56) References Cited

U.S. PATENT DOCUMENTS

| 6,359,935 | B1 | 3/2002 | Hui et al. | |
|---|---|---|---|---|
| 7,486,726 | B2 | 2/2009 | Alexander et al. | |
| 2005/0013450 | A1* | 1/2005 | Kumazawa | 381/103 |
| 2005/0271165 | A1 | 12/2005 | Geraniotis et al. | |
| 2005/0286658 | A1* | 12/2005 | Hasebe et al. | 375/341 |
| 2006/0062283 | A1 | 3/2006 | Zhang et al. | |
| 2006/0126577 | A1* | 6/2006 | Yano et al. | 370/337 |
| 2006/0164563 | A1* | 7/2006 | Watanabe et al. | 348/731 |
| 2011/0158359 | A1 | 6/2011 | Khayrallah et al. | |
| 2011/0188561 | A1* | 8/2011 | Mizrahi et al. | 375/227 |

FOREIGN PATENT DOCUMENTS

WO    2007003837    11/2007

* cited by examiner

*Primary Examiner* — Leila Malek
(74) *Attorney, Agent, or Firm* — Oblon, McClelland, Maier & Neustadt, L.L.P.

(57) ABSTRACT

Repeatedly: pre-processing a received signal using feedback to obtain a pre-processed signal, the feedback being based on a previous signal, the previous signal being received prior to the received signal; evaluating at least one of a quality of a demodulated signal and a quality of a decoded signal, the demodulated signal being obtained from the pre-processed signal by demodulating, the decoded signal being obtained by decoding the demodulated signal; deciding if the respective at least one of the quality of the demodulated signal and the quality of the decoded signal is sufficient; selecting neither or one of the demodulated signal and the decoded signal as a selected signal based on the at least one of the quality of the demodulated signal and the quality of the decoded signal for which it is decided whether or not the quality is sufficient; and updating the feedback based on the selected signal.

20 Claims, 3 Drawing Sheets

SIGNAL SELECTION

CROSS REFERENCE TO RELATED APPLICATION

This application claims benefit under 35 U.S.C. §119(a) and 37 CFR 1.55 to UK patent application no. GB1220956.5, filed on 21 Nov. 2012, the entire content of which is hereby incorporated by reference.

TECHNICAL FIELD

The present disclosure relates to an apparatus, a method, and a computer program product for a receiver. In particular, but not exclusively, the present disclosure relates to an apparatus, a method, and a computer program product for an iterative receiver.

BACKGROUND

Abbreviations

3GPP 3rd Generation Partnership Project
BLER Block Error Rate
CDMA Code Division Multiple Access
CRC Cyclic Redundancy Check
DL Downlink
eNB Enhanced Node B (Node B in LTE)
HSPA High Speed Packet Access
LAN Local Area Network
LTE™ Long Term Evolution
LTE-A™ Long Term Evolution Advanced
MIMO Multiple Input—Multiple Output
RAN Radio Access Network
SINR Signal to Interference and Noise Ratio
SNR Signal to Noise Ratio
UE User Equipment
UL Uplink
UMTS Universal Mobile Telecommunication System
WCDMA Wideband CDMA
WiFi Wireless Fidelity
WLAN Wireless LAN In conventional modems such as advanced modems, there are iterative receivers in place where the received signal is utilized iteratively to improve receiver performance. The feedback signal can be used to improve channel estimation and/or to subtract interference, for example. There are some potential sources for the feedback signal such as:

Demodulator feedback signal (hereinafter also called short feedback signal), and Decoder feedback signal (hereinafter also called long feedback signal).

Some conventional receivers such as advanced receivers use either short feedback signals or long feedback signals but do not switch between these feedback signals.

Known prior art discloses a method where both long and short feedback signals are used but does not disclose decision any criteria for determining which feedback signal is to be used.

SUMMARY

In accordance with first embodiments, there is apparatus for use in a receiver, the apparatus comprising at least one processor, and at least one memory including computer program code, the at least one memory and the computer program code being configured to, with the at least one processor, cause the apparatus at least to, repeatedly:

pre-process a received signal using feedback to obtain a pre-processed signal, wherein the feedback is based on a previous signal and the previous signal is received prior to the received signal;

evaluate at least one of a quality of a demodulated signal and a quality of a decoded signal, wherein the demodulated signal is obtained from the pre-processed signal by demodulating, and the decoded signal is obtained by decoding the demodulated signal;

decide if the respective at least one of the quality of the demodulated signal and the quality of the decoded signal is sufficient;

select neither or one of the demodulated signal and the decoded signal as a selected signal based on the at least one of the quality of the demodulated signal and the quality of the decoded signal for which it is decided whether or not the quality is sufficient; and update the feedback based on the selected signal.

In accordance with second embodiments, there is a method for use in a receiver, the method comprising, repeatedly:

pre-processing a received signal using feedback to obtain a pre-processed signal, wherein the feedback is based on a previous signal and the previous signal is received prior to the received signal;

evaluating at least one of a quality of a demodulated signal and a quality of a decoded signal, wherein the demodulated signal is obtained from the pre-processed signal by demodulating, and the decoded signal is obtained by decoding the demodulated signal;

deciding if the respective at least one of the quality of the demodulated signal and the quality of the decoded signal is sufficient;

selecting neither or one of the demodulated signal and the decoded signal as a selected signal based on the at least one of the quality of the demodulated signal and the quality of the decoded signal for which it is decided whether or not the quality is sufficient; and updating the feedback based on the selected signal.

According to third embodiments, there is provided a computer program product comprising a non-transitory computer-readable storage medium having computer readable instructions stored thereon, the computer readable instructions being executable by a computerized device to cause the computerized device to perform a method according to the second embodiments.

Further features of embodiments will become apparent from the following description of preferred embodiments, given by way of example only, which is made with reference to the accompanying drawings.

BRIEF DESCRIPTION OF THE DRAWINGS

Further details and features are apparent from the following detailed description of embodiments of the present disclosure which is to be taken in conjunction with the appended drawings, wherein.

DETAILED DESCRIPTION

Herein below, certain embodiments of the present disclosure are described in detail with reference to the accompanying drawings, wherein the features of the embodiments can be freely combined with each other unless otherwise described. However, it is to be expressly understood that the description of certain embodiments is given for by way of example only, and that it is by no way intended to be understood as limiting embodiments to the disclosed details.

Moreover, it is to be understood that the apparatus is configured to perform the corresponding method, although in some cases only the apparatus or only the method are described.

The demodulator feedback signal (short feedback signal) is rarely totally error-free because it does not utilize error correction coding.

It is known that decoder feedback signal (long feedback signal) is perfect when the decoding was successful. Successfulness criteria for decoding may be obtained by e.g.:

A. Cyclic redundancy check
B. Decoder metrics, e.g. indicating a bit error ratio However, when decoding is considered unsuccessful, the decoder feedback signal may be either still useful or useless as a feedback signal.

It is expected that most of the time the long feedback signal is of better quality than the short feedback signal. This is because the expected Block Error Ratio (BLER) is usually kept low by link adaptation or power control procedures. Expected BLER is typically kept between 1 and 20%, depending on the system, meaning that 80 to 99% of the long feedback data blocks are of perfect quality.

Figure 1:
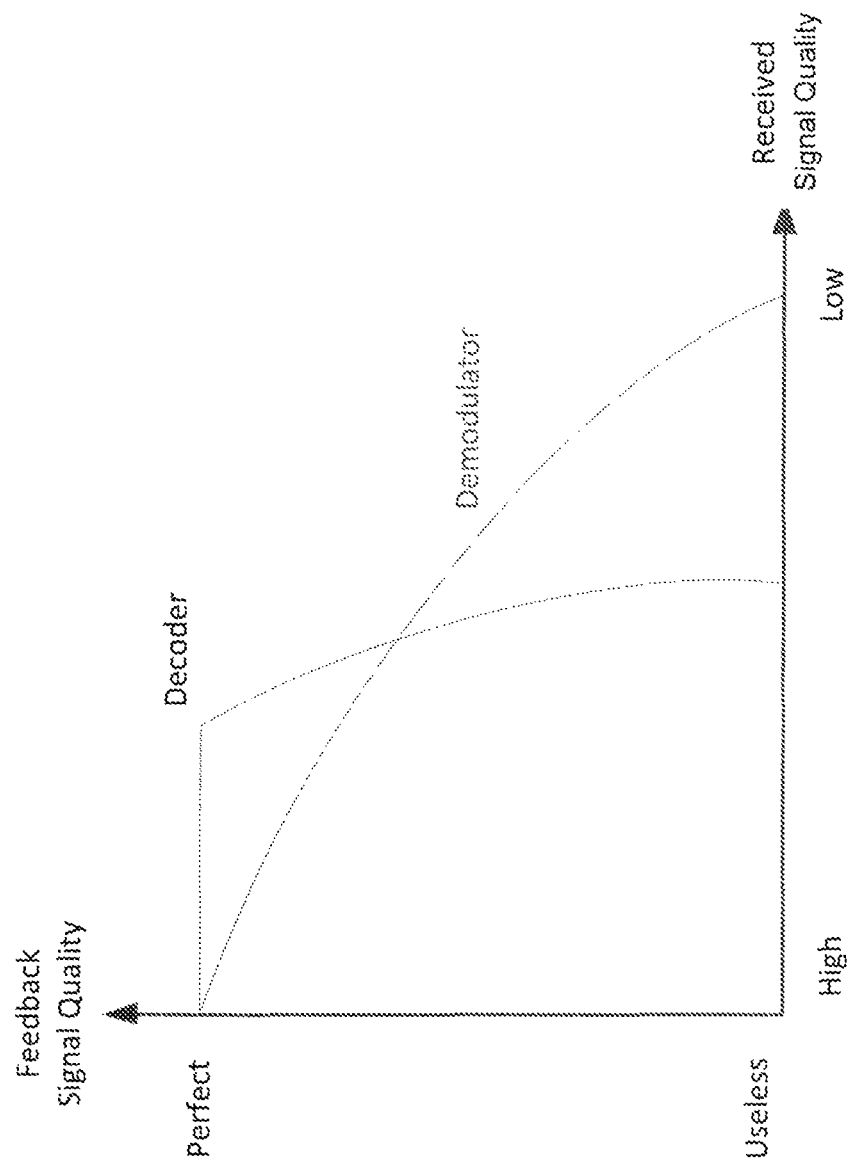
FIG. 1 shows a relation of feedback signal quality and received data quality for the demodulated signal and the decoded signal.

The usefulness of the short and long feedback signals as a function of received data quality is illustrated in FIG. 1. FIG. 1 shows schematically the quality of the feedback signal for demodulator (short) and decoder (long) feedback signals as function of received signal quality.

If the iterative receiver design utilizes only long feedback signal, it misses the performance improvement potential given by the use of short feedback signal in lower received data quality scenarios where decoding fails.

On the other hand, if the iterative receiver design utilizes only short feedback signal, it misses the performance improvement potential given by the use of long feedback signals in higher received data quality scenarios where decoding succeeds.

As long as the decoding is successful, the long feedback signal is a perfect feedback signal. When the decoding is not successful because of a low received signal quality, it may still be used if e.g. some decoder metrics indicate a sufficiently high quality to serve as feedback signal. Any kind of metrics indicating the bit-error-ratio in the decoder output may be used. There have been several studies in the literature for Turbo Decoder metrics to be used in TDEC Autostop functionality. U.S. Pat. No. 7,272,771, for example, describes some metrics that might be useable also for this purpose. However, the feedback signal quality typically drops rather fast with the deterioration of the received signal quality.

On the other hand, the quality of the short feedback signal decreases rather slowly with the deterioration of the received signal quality. Therefore, at high received signal quality, the quality of the short feedback signal is inferior to that of the long feedback signal, whilst at low received signal quality, the quality of the short feedback signal is superior to that of the long feedback signal.

Also, the demodulated but not decoded signal may have a sufficiently high quality to base a feedback thereon or not. A measure of the quality of the demodulated signal may be its SINR or its SNR, for example.

According to some embodiments, the iterative receiver selects continuously either long feedback or short feedback in order to improve the performance of the receiver. Thus, in some embodiments, the performance is maximized.

Figure 2:
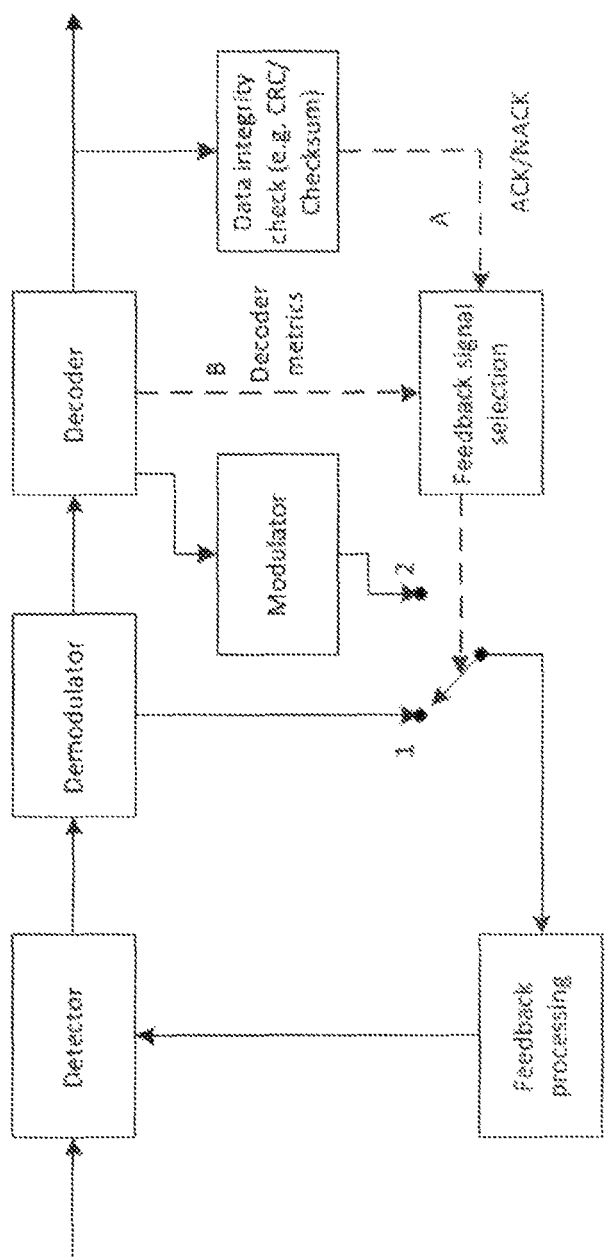
FIG. 2 shows an apparatus according to embodiments.

FIG. 2 shows a block diagram of an iterative receiver with feedback signal selection according to an embodiment.

In this embodiment, the received signal arrives at the Detector such as a Receiver front end. After some pre-processing in the Detector, the signal is demodulated by the Demodulator.

Short feedback signal (Source 1) is obtained after the Demodulator. The demodulated signal goes to the Decoder for decoding. The Decoder also creates the unmodulated long feedback signal that is modulated by the Modulator (Source 2).

In some embodiments, the decoded signal is fed to a cyclic redundancy check block that calculates if decoding was perfectly successful or not (Criterion A). A cyclic redundancy check is one example mechanism for checking whether the decoding was successful, but other mechanisms such as parity bits, checksums, CRCs, repetition coding, etc., may be used, too. In some embodiments, the decoder provides a decoding metric that indicates the decoding quality and the usefulness of the long feedback signal (Criterion B).

According to different embodiments, the feedback signal selection uses either Criterion A or Criterion B or both to select if the short or long feedback signal is used. In detail, based on one or both of criteria A and B, the feedback signal selection decides which of the long and short feedback signals will likely have a higher quality, and selects this feedback signal. In some embodiments where both criteria A and B are used, long the feedback signal will be selected if one of criteria A and B indicates that the long feedback signal has superior quality, whilst in other embodiments, the long feedback signal is selected only if both criteria A and B indicate superior quality of the long feedback.

If neither of the qualities according to criterion A and according to criterion B is sufficient, according to different embodiments, either short feedback is selected, or none of the feedbacks is selected.

In FIG. 2, the selection is indicated by a switch that is controlled by the feedback signal selection block. Note that FIG. 2 shows a logical structure, and instead of a (mechanical) switch, a corresponding function may be implemented by software, firmware, an electronic circuit, etc.

The selected feedback signal goes to Feedback processing that provides the feedback signal (as required iterative receiver signals) to the Receiver front end.

In embodiments, the decoded signal passes through the Modulator only if long feedback is selected. E.g., the Modulator may be logically arranged somewhere in the path from the Decoder via the (logical) switch to the Feedback processing block and is switched on and off by the Feedback signal selection block. If it is switched off, the signal will bypass the Modulator without being modulated. Thus, power consumption is reduced because unnecessary modulation is avoided if the short feedback signal is selected.

In embodiments, instead or in addition to the feedback selection being based on the quality of the long feedback signal (criteria A and/or B), the quality of the short feedback signal (criterion C) is used for the selection. A quality criterion may be SINR or SIR of the demodulated signal. If these criteria are used, the quality of the short feedback signal is considered to be sufficient if the respective one or both of the SINR and SIR are above respective predetermined thresholds.

For example, in some embodiments, only the short feedback quality will be checked. If the short feedback quality is sufficient, the short feedback signal will be selected. Otherwise, the short feedback signal is not selected. According to different embodiments, in this case, either the long feedback signal is selected or neither of the feedback signals is selected.

In some embodiments, both the long feedback quality (criteria A and/or B) and short feedback quality (criterion C) is used for the selection. For example, in some embodiments, if the long feedback quality is sufficient, the long feedback signal is selected irrespective of the short feedback quality. If the long feedback quality is not sufficient, the short feedback quality is checked. If it is sufficient, the short feedback signal is selected. Otherwise, none of the signals is selected.

In some other embodiments, short feedback quality may be checked first. If it is sufficient, the short feedback signal is selected. If not, long feedback quality is checked. If it is sufficient, the long feedback signal is selected, otherwise, none of the signals is selected.

An effect of embodiments checking the short feedback quality first or only is that less processing steps for the feedback are required. On the other hand, if the long feedback quality is checked first or only, in general, the quality of the feedback will be improved (see FIG. 1). If none of the feedback signals is selected, i.e. an older feedback signal is used and not updated with new feedback signal, this may improve the feedback compared with updating it by a poor feedback signal.

Figure 3:
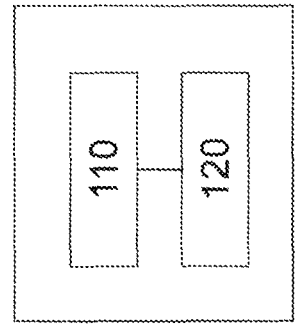
FIG. 3 shows an apparatus according to embodiments.
Figure 4:
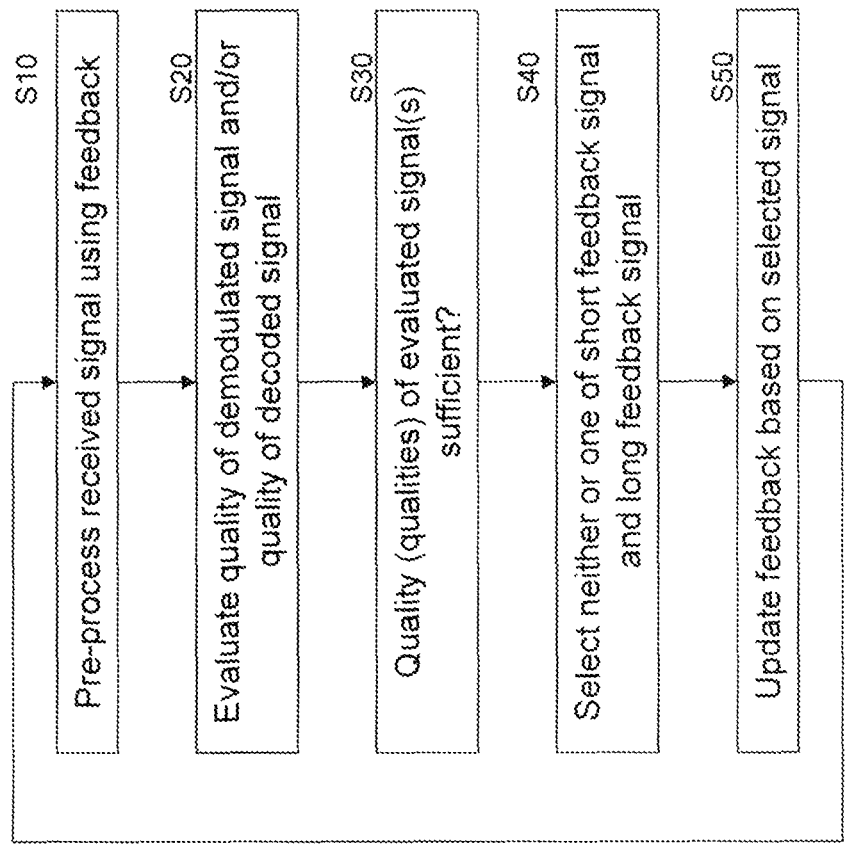
FIG. 4 shows a method according to embodiments.

FIG. 3 shows an apparatus according to an embodiment. The apparatus may be a receiver or a part thereof. FIG. 4 shows a method according to an embodiment. The apparatus according to FIG. 3 may perform the method of FIG. 4 but is not limited to this method. The method of FIG. 4 may be performed by the apparatus of FIG. 3 but is not limited to being performed by this apparatus.

The apparatus comprises a processing system and/or at least one processor 110 and at least one memory 120. The at least one memory 120 includes computer program code, and the at least one processor 110, with the at least one memory 120 and the computer program code is arranged to cause the apparatus to at least perform repeatedly, after an initializing phase:

Pre-processing (S10) a received signal using a feedback to obtain a pre-processed signal, wherein the feedback is based on a previous signal and the previous signal is received prior to the received signal. In some embodiments, the previous signal is the signal received on the same channel immediately before the received signal. In other embodiments, some other signals may be received on the same channel between the previous signal and the received signal. Thus, the processing requirements may be relaxed at the cost of less actual feedback. Pre-processing may comprise e.g. one or both of channel estimation using the feedback and subtracting inter-symbol-interference using the feedback.

The at least one processor may evaluate (S20) at least one of a quality of a demodulated signal and a quality of a decoded signal. The demodulated signal is obtained from the pre-processed signal by demodulating. The decoded signal is obtained by decoding the demodulated signal. Demodulating and/or decoding may be performed by a processor different from the at least one processor or may be performed by the at least one processor. For the demodulated signal, the quality may be expressed e.g. in terms of SINR or SNR. For the decoded signal, this quality may be based e.g. on parity bits, checksums, cyclic redundancy check, repetition coding etc., or one or more decoder metrics.

The at least one processor decides (S30) if the respective one or more of the quality of the demodulated signal and the quality of the decoded signal is sufficient.

Based on the one or more of the quality of the demodulated signal and the quality of the decoded signal for which it is decided whether or not they are sufficient, neither or one of the demodulated signal and the decoded signal is selected as a selected signal (S40). That is, if it is decided for only one of the qualities whether or not it is sufficient, the selection is based only on this quality. If it is decided for both qualities whether or not they are sufficient, the selection is based on both qualities or based on one quality only, if this quality has prevalence over the other one. For example, if according to some embodiments the quality of the decoded signal is sufficient, the decoded signal is selected irrespective of the quality of the demodulated signal. In some embodiments, in particular if it is decided that none of the one or more qualities is sufficient, neither of the demodulated signal and decoded signal are selected as the selected signal.

The feedback used by the pre-processing is updated (S50) based on the selected signal. Thus, the pre-processing of a following received signal is based on the updated feedback. If neither of the demodulated signal and the decoded signal is selected, the feedback is not updated. In some embodiments, this is realized by updating the feedback by the signal by which it was previously updated.

Embodiments are described based on a CDMA system but embodiments may be applied to other radio access technologies such as LTE, LTE-A, WiFi, WLAN, UMTS, HSPA, if iterative receivers may be employed. Further, embodiments may be employed in wireline transmission systems, too, if iterative receivers may be used.

According to some embodiments, pre-processing may also comprise any one or more of the following tasks such as: subtracting inter-layer-interference, e.g. in multiple input-multiple output (MIMO) mode; inter-stream-interference in MIMO, e.g. based on WCDMA (in this respect, it is noted that the terms used are different in LTE and WCDMA but define substantially corresponding items); and estimating noise covariance.

A terminal may be a machine type device, a user equipment, a mobile phone, a laptop, a smartphone, a tablet PC, or any other device that may attach to a mobile network. A base station may be a NodeB, an eNodeB or any other base station of a radio network.

If not otherwise stated or otherwise made clear from the context, the statement that two entities are different means that they are differently addressed in their respective network. It does not necessarily mean that they are based on different hardware. That is, each of the entities described in the present description may be based on a different hardware, or some or all of the entities may be based on the same hardware.

According to the above description, it should thus be apparent that examples embodiments of the present disclosure provide, for example a receiver such as an iterative receiver, or a component thereof, an apparatus such as a terminal or a base station embodying the same, a method for controlling and/or operating the same, and computer program(s) controlling and/or operating the same as well as mediums carrying such computer program(s) and forming computer program product(s).

According to example embodiments of the present disclosure, a system may comprise any conceivable combination of the thus depicted devices/apparatuses and other network elements, which are configured to cooperate with any one of them.

In general, it is to be noted that respective functional blocks or elements according to above-described aspects can be implemented by any known means, either in hardware and/or software/firmware, respectively, if it is only adapted to perform the described functions of the respective parts. The mentioned method steps can be realized in individual functional blocks or by individual devices, or one or more of the method steps can be realized in a single functional block or by a single device.

Generally, any structural means such as a processor or other circuitry may refer to one or more of the following: (a) hardware-only circuit implementations (such as implementations in only analog and/or digital circuitry) and (b) combinations of circuits and software (and/or firmware), such as (as applicable): (i) a combination of processor(s) or (ii) portions of processor(s)/software (including digital signal processor(s)), software, and memory(ies) that work together to cause an apparatus, such as a mobile phone or server, to perform various functions) and (c) circuits, such as a microprocessor(s) or a portion of a microprocessor(s), that require software or firmware for operation, even if the software or firmware is not physically present. Also, it may also cover an implementation of merely a processor (or multiple processors) or portion of a processor and its (or their) accompanying software and/or firmware, any integrated circuit, or the like.

Generally, any procedural step or functionality is suitable to be implemented as software/firmware or by hardware without changing the ideas of the present disclosure. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present disclosure also covers any conceivable combination of method steps and operations described above, and any conceivable combination of nodes, apparatuses, modules or elements described above, as long as the above-described concepts of methodology and structural arrangement are applicable.

The method of the second embodiments may be a method of feedback selection.

The computer program product of the third embodiments may be embodied as a computer-readable medium.

According to embodiments, there is apparatus, comprising pre-processing means adapted to pre-process repeatedly a received signal using a feedback to obtain a pre-processed signal, wherein the feedback is based on a previous signal and the previous signal is received prior to the received signal; evaluating means adapted to evaluate at least one of a quality of a demodulated signal and a quality of a decoded signal, wherein the demodulated signal is obtained from the pre-processed signal by demodulating, and the decoded signal is obtained by decoding the demodulated signal; deciding means adapted to decide if the respective at least one of the quality of the demodulated signal and the quality of the decoded signal is sufficient; selecting means adapted to select none or one of the demodulated signal and the decoded signal as a selected signal based on the at least one of the quality of the demodulated signal and the quality of the decoded signal for which it is decided whether or not the quality is sufficient; and updating means adapted to update the feedback based on the selected signal.

In accordance with fourth embodiments, there is a receiver, comprising an apparatus according to the first embodiments, and at least one radio interface for receiving the received signal.

In accordance with fifth embodiments, there is a terminal, comprising a receiver according to the fourth embodiments, and at least one processor arranged to process the decoded signal.

In accordance with sixth embodiments, there is a base station, comprising a receiver according to the fourth embodiments, and at least one processor arranged to process the decoded signal.

According to some embodiments of the present disclosure, for example at least one of the following are achieved:

The performance of the receiver is improved because the most suitable one of the long and short feedback signals is used. Only few components of the receiver are affected. In particular, demodulating and decoding are not affected. The sender of the signal to be received is not affected, thus backwards compatibility in a network of senders and receivers is ensured.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of embodiments, which is defined in the accompanying claims.

We claim:

1. Apparatus for use in a receiver, the apparatus comprising at least one processor, and at least one memory including computer program code, the at least one memory and the computer program code being configured to, with the at least one processor, cause the apparatus to at least, repeatedly:

pre-process a received signal using feedback to obtain a pre-processed signal, wherein the feedback is based on a previous signal and the previous signal is received prior to the received signal;

evaluate at least one of a quality of a demodulated signal and a quality of a decoded signal, wherein the demodulated signal is obtained from the pre-processed signal by demodulating, and the decoded signal is obtained by decoding the demodulated signal;

decide if the respective at least one of the quality of the demodulated signal and the quality of the decoded signal is sufficient;

select neither or one of the demodulated signal and the decoded signal as a selected signal based on the at least one of the quality of the demodulated signal and the quality of the decoded signal for which it is decided whether or not the quality is sufficient; and update the feedback based on the selected signal.

2. Apparatus according to claim 1, the at least one memory and the computer program code being configured to, with the at least one processor, cause the apparatus to:

select the decoded signal as the selected signal if it is decided that the quality of the decoded signal is sufficient; and select the demodulated signal as the selected signal if it is not decided whether or not the quality of the demodulated signal is sufficient, or if it is decided that the quality of the demodulated signal is sufficient and if one of the following is fulfilled:
the quality of the decoded signal is not sufficient, and
it is not decided whether or not the quality of the decoded signal is sufficient.

3. Apparatus according to claim 1, the at least one memory and the computer program code being configured to, with the at least one processor, cause the apparatus to:

select the demodulated signal as the selected signal if it is decided that the quality of the demodulated signal is sufficient; and select the decoded signal as the selected signal if it is not decided whether or not the quality of the decoded signal is sufficient, or if it is decided that the quality of the decoded signal is sufficient and if one of the following is fulfilled:
the quality of the decoded signal is not sufficient, and
it is not decided whether or not the quality of the demodulated signal is sufficient.

4. Apparatus according to claim 1, the at least one memory and the computer program code being configured to, with the at least one processor, cause the apparatus to:

select neither of the demodulated signal and the decoded signal as the selected signal if it is decided that neither the quality of the demodulated signal nor the quality of the decoded signal is sufficient, and/or repeatedly at least one of:
demodulate the pre-processed signal to obtain the demodulated signal; and
decode the demodulated signal to obtain the decoded signal.

5. Apparatus according to claim 1, the at least one memory and the computer program code being configured to, with the at least one processor, cause the apparatus to modulate the decoded signal to obtain a modulated decoded signal if the decoded signal is selected as the selected signal, wherein the updating of the feedback is based on the modulated decoded signal.

6. Apparatus according to claim 1, wherein the quality of the decoded signal is sufficient if it is indicated that:
the decoding of the demodulated signal is successful, and/or
one or more decoder metrics of the decoding are in a predetermined range, and/or
at least one of a signal to interference and noise ratio and a signal to noise ratio of the demodulated signal exceeds a respective predetermined threshold.

7. Apparatus according to claim 6, the at least one memory and the computer program code being configured to, with the at least one processor, cause the apparatus to perform a cyclic redundancy check of the decoded signal, and to indicate that the decoding is successful if the cyclic redundancy check does not result in an error.

8. Apparatus according to claim 1, wherein the pre-processing comprises at least one of:
using the feedback as a reference signal for estimating a channel of the received signal;
using the feedback in subtracting an estimated inter-symbol-interference from the received signal;
using the feedback in subtracting inter-layer-interference;
using the feedback in subtracting inter-stream-interference; and
using the feedback in estimating a noise covariance.

9. A receiver, comprising:
apparatus according to claim 1; and
at least one radio interface for receiving the received signal.

10. A terminal and/or a base station, comprising:
a receiver according to claim 9; and
at least one processor arranged to process the decoded signal.

11. A method for use in a receiver, the method comprising, repeatedly:
pre-processing a received signal using feedback to obtain a pre-processed signal, wherein the feedback is based on a previous signal and the previous signal is received prior to the received signal;
evaluating at least one of a quality of a demodulated signal and a quality of a decoded signal, wherein the demodulated signal is obtained from the pre-processed signal by demodulating, and the decoded signal is obtained by decoding the demodulated signal;
deciding if the respective at least one of the quality of the demodulated signal and the quality of the decoded signal is sufficient;
selecting neither or one of the demodulated signal and the decoded signal as a selected signal based on the at least one of the quality of the demodulated signal and the quality of the decoded signal for which it is decided whether or not the quality is sufficient; and
updating the feedback based on the selected signal.

12. A method according to claim 11, further comprising:
selecting the decoded signal as the selected signal if it is decided that the quality of the decoded signal is sufficient; and
selecting the demodulated signal as the selected signal if it is not decided whether or not the quality of the demodulated signal is sufficient, or if it is decided that the quality of the demodulated signal is sufficient and if one of the following is fulfilled:
the quality of the decoded signal is not sufficient, and
it is not decided whether or not the quality of the decoded signal is sufficient.

13. A method according to claim 11, further comprising:
selecting the demodulated signal as the selected signal if it is decided that the quality of the demodulated signal is sufficient; and
selecting the decoded signal as the selected signal if it is not decided whether or not the quality of the decoded signal is sufficient, or if it is decided that the quality of the decoded signal is sufficient and if one of the following is fulfilled:
the quality of the demodulated signal is not sufficient, and
it is not decided whether or not the quality of the demodulated signal is sufficient.

14. A method according to claim 11, further comprising selecting neither of the demodulated signal and the decoded signal as the selected signal if it is decided that neither the quality of the demodulated signal nor the quality of the decoded signal is sufficient.

15. A method according to claim 11, further comprising, repeatedly at least one of:
demodulating the pre-processed signal to obtain the demodulated signal; and
decoding the demodulated signal to obtain the decoded signal.

16. A method according to claim 11, further comprising modulating the decoded signal to obtain a modulated decoded signal if the decoded signal is selected as the selected signal, wherein the updating of the feedback is based on the modulated decoded signal.

17. A method according to claim 11, wherein the quality of the decoded signal is sufficient if it is indicated that:
the decoding of the demodulated signal is successful, and/or
one or more decoder metrics of the decoding are in a predetermined range, and/or
at least one of a signal to interference and noise ratio and a signal to noise ratio of the demodulated signal exceeds a respective predetermined threshold.

18. A method according to claim 17, further comprising performing a cyclic redundancy check of the decoded signal, and indicating that the decoding is successful if the cyclic redundancy check does not result in an error.

19. A method according to claim 11, wherein the pre-processing comprises at least one of:
using the feedback as a reference signal for estimating a channel of the received signal;
using the feedback in subtracting an estimated inter-symbol-interference from the received signal;
using the feedback in subtracting inter-layer-interference;
using the feedback in subtracting inter-stream-interference; and
using the feedback in estimating a noise covariance.

20. A computer program product comprising a non-transitory computer-readable storage medium having computer readable instructions stored thereon, the computer readable instructions being executable by a computerized device to cause the computerized device to perform, repeatedly:
pre-processing a received signal using feedback to obtain a pre-processed signal, wherein the feedback is based on a previous signal and the previous signal is received prior to the received signal;
evaluating at least one of a quality of a demodulated signal and a quality of a decoded signal, wherein the demodulated signal is obtained from the pre-processed signal by demodulating, and the decoded signal is obtained by decoding the demodulated signal;
deciding if the respective at least one of the quality of the demodulated signal and the quality of the decoded signal is sufficient;
selecting neither or one of the demodulated signal and the decoded signal as a selected signal based on the at least one of the quality of the demodulated signal and the quality of the decoded signal for which it is decided whether or not the quality is sufficient; and
updating the feedback based on the selected signal.

* * * * *